(12) United States Patent
Matt et al.

(10) Patent No.: US 10,970,433 B2
(45) Date of Patent: *Apr. 6, 2021

(54) SYSTEMS AND METHODS FOR PARTICLE PATTERN SIMULATION

(71) Applicant: CHIPS UNLIMITED, INC., Tempe, AZ (US)

(72) Inventors: Michael Matt, Phoenix, AZ (US); Kenneth Leo Haus, Cottage Grove, MN (US); Ryan P. Salsman, Bloomington, MN (US); Thomas Craig Valenty, Brooklyn Center, MN (US)

(73) Assignee: Chips Unlimited, Inc., Tempe, AZ (US)

(*) Notice: Subject to any disclaimer, the term of this patent is extended or adjusted under 35 U.S.C. 154(b) by 144 days.

This patent is subject to a terminal disclaimer.

(21) Appl. No.: 16/363,911

(22) Filed: Mar. 25, 2019

(65) Prior Publication Data
US 2019/0220557 A1 Jul. 18, 2019

Related U.S. Application Data

(63) Continuation of application No. 13/717,251, filed on Dec. 17, 2012, now Pat. No. 10,282,493.

(60) Provisional application No. 61/578,055, filed on Dec. 20, 2011.

(51) Int. Cl.
*G06Q 30/00* (2012.01)
*G06F 30/20* (2020.01)
*G06F 30/13* (2020.01)
*G06F 111/10* (2020.01)

(52) U.S. Cl.
CPC .............. *G06F 30/20* (2020.01); *G06F 30/13* (2020.01); *G06F 2111/10* (2020.01)

(58) Field of Classification Search
CPC ....... G06F 30/20; G06F 30/13; G06F 2111/10
USPC .............................................. 705/26.1–27.2
See application file for complete search history.

(56) References Cited

U.S. PATENT DOCUMENTS

2005/0114235 A1* 5/2005 Snyder ................. G06Q 10/087
705/28
2005/0276053 A1* 12/2005 Nortrup ................ F21V 29/677
362/294

OTHER PUBLICATIONS

Zhao, Y. F., Wong, T. N., Tan, S. T., & Chen, W. J. (1997). A model for simulating flexible surfaces of cloth objects. Computers and Structures, 63(1), 133-47. doi:http://dx.doi.org/10.1016/S0045-7949(96)00309-4 (Year: 1997).*

* cited by examiner

*Primary Examiner* — Anand Loharikar
(74) *Attorney, Agent, or Firm* — Snell & Wilmer L.L.P.

(57) ABSTRACT

A method is provided comprising, receiving, by a computer system comprising a processor and a tangible, non-transitory memory, particle parameters, creating, by the computer system, particle elements in accordance with the particle parameters, and building, by the computer system, a pattern using the particle elements.

20 Claims, 14 Drawing Sheets

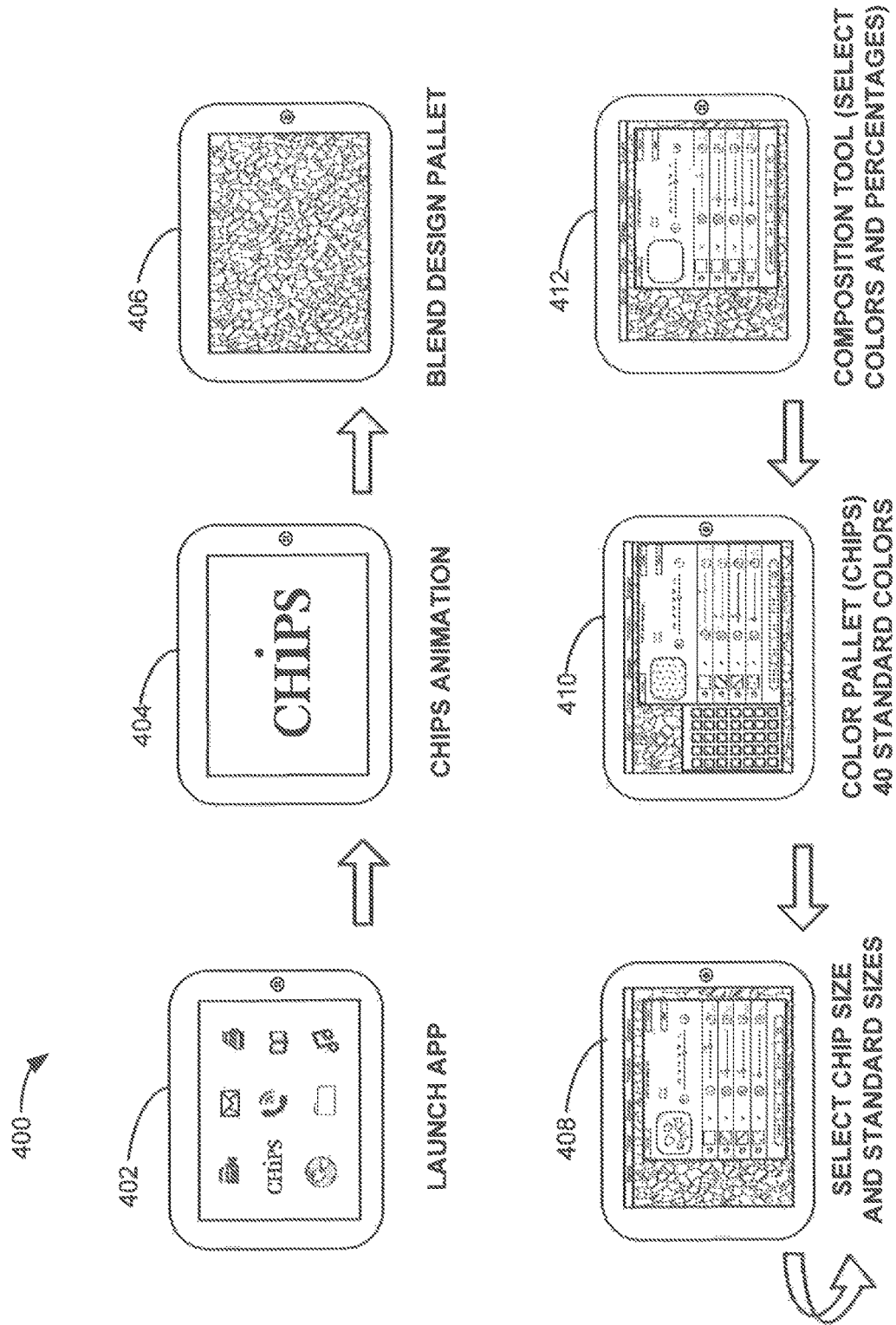

SYSTEMS AND METHODS FOR PARTICLE PATTERN SIMULATION

CROSS REFERENCE TO RELATED APPLICATIONS

This application a continuation of U.S. patent application Ser. No. 13/717,251, filed Dec. 17, 2012 and entitled "SYSTEMS AND METHODS FOR PARTICLE PATTERN SIMULATION", which claims priority to U.S. Provisional Application No. 61/578,055, filed Dec. 20, 2011 and entitled "SYSTEMS AND METHODS FOR PARTICLE PATTERN SIMULATION", the contents of each of which are incorporated by reference in their entirety.

FIELD

This disclosure generally relates to modeling particle patterns in seamless surface coverings.

BACKGROUND

Seamless surface coverings (sometimes referred to as chemical surface covering materials) may be used for wall or floor covering and provide a clean, seamless solution for wall and floor covering found in residential, commercial and industrial areas. Currently, both commercially and residentially, there are many different types of chemical surface covering materials that yield a seamless surface on a substrate that is both durable and decorative. Chemical surface covering materials may be used on a variety of substrates, such as concrete, wood, and the like. These chemical surface covering materials typically consist of a clear (or pigmented) hardening material and a plurality of particles. Most commonly, the hardening material, such as polyester, urethane, polyurethane, polymethylmethacrylate, methylmethacrylate (MMA), polyaspartic, polyurea, or epoxy compounds, is applied in viscous form to a substrate. Then, a group of particles is broadcast or distributed on top of the hardening material, and the coating is allowed to cure. Alternatively, or in combination with the above, particles may be mixed with the hardening material to create a composite slurry that is then distributed over a substrate to provide a durable and decorative coating. A top coat may then optionally be applied. Once cured, the resultant surface covering is nearly or completely seamless. Examples of floor covering materials that incorporate some combination of hardening materials and particles include, but are not limited to, quartz floors, decorative chip floors, decorative flake floors, mica floors, and terrazzo floors.

The particles used may vary in size (e.g., length, width, and depth), geometry, color, and relative proportion to one another. Examples of particles used in seamless surface covering applications include, but are not limited to, color chips, color flakes, color quartz, mica, glass, stones, and rocks (generally referenced as aggregate or decorative media). As it is difficult to predict what pattern a plurality of particles will assume prior to application to a substrate, it may be difficult for a consumer to visualize or imagine what a finished surface covering might look like for a given plurality of particles. One may produce "swatches" or samples of a particle pattern, though this approach only captures a small portion of the near infinite possible configurations, limiting the ability to accurately simulate a particle pattern Thus, there is a need to model particle patterns without having to perform an installation of a seamless surface covering.

SUMMARY

In accordance with various aspects of the present invention, systems and methods are disclosed for creating a modeling or simulating pattern using given particle elements for use of such pattern in seamless surface coverings. In various embodiments, a method is provided comprising, receiving, by a computer system comprising a processor and a tangible, non-transitory memory, particle parameters, creating, by the computer system, particle elements in accordance with the particle parameters, and building, by the computer system, a pattern using the particle elements.

In various embodiments, a system for particle pattern simulation is provided, the system comprising a non-transitory memory communicating with a processor, the non-transitory memory having instructions stored thereon that, in response to execution by the processor, cause the processor to perform operations comprising receiving, by the processor, particle parameters, creating, by the processor, particle elements in accordance with the particle parameters, building, by the processor, a pattern using the particle elements.

In various embodiments, a computer readable medium bearing instructions for particle pattern simulation is provided, the instructions, when executed by a processor, cause said processor to perform operations comprising receiving, at a processor, particle parameters, creating, by the processor, particle elements in accordance with the particle parameters, building, by the processor, a pattern using the particle elements.

In various embodiments, a system for particle pattern simulation is provided, the system comprising, a color sensor in communication with a processor, a non-transitory memory communicating with the processor, the non-transitory memory having instructions stored thereon that, in response to execution by the processor, cause the processor to perform operations comprising receiving, by the processor, an input color from the color sensor, receiving, by the processor, particle parameters, wherein the particle parameters comprises the input color, creating, by the processor, particle elements in accordance with the, particle parameters, building, by the processor, a pattern using the particle elements.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosed embodiments.

FIGS. 4A-4D illustrate an exemplary application flow in accordance with various embodiments;

Figure 5:
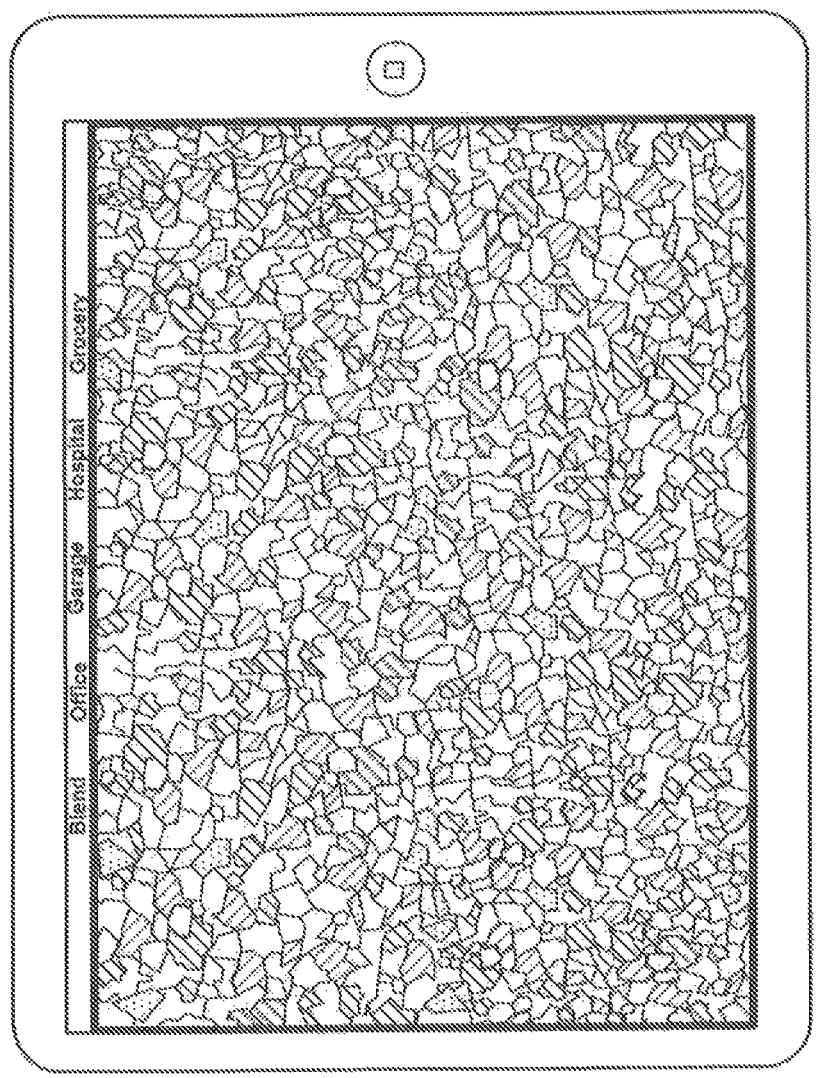
Figure 6:
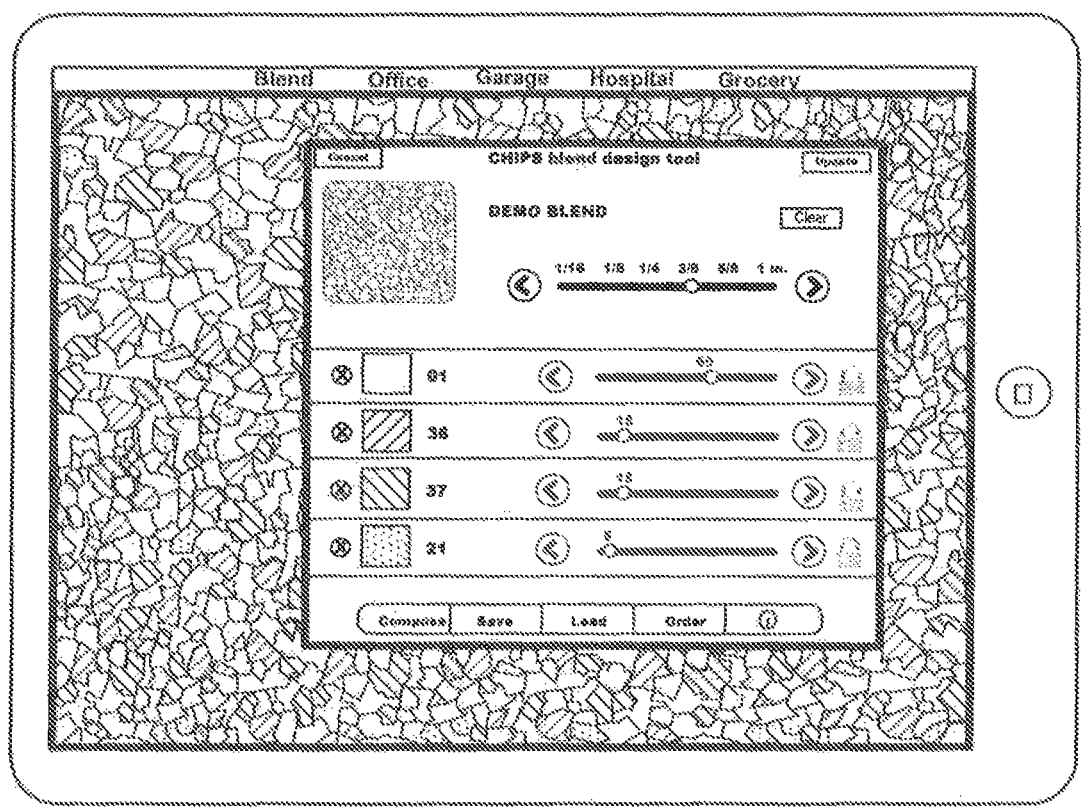
Figure 7:
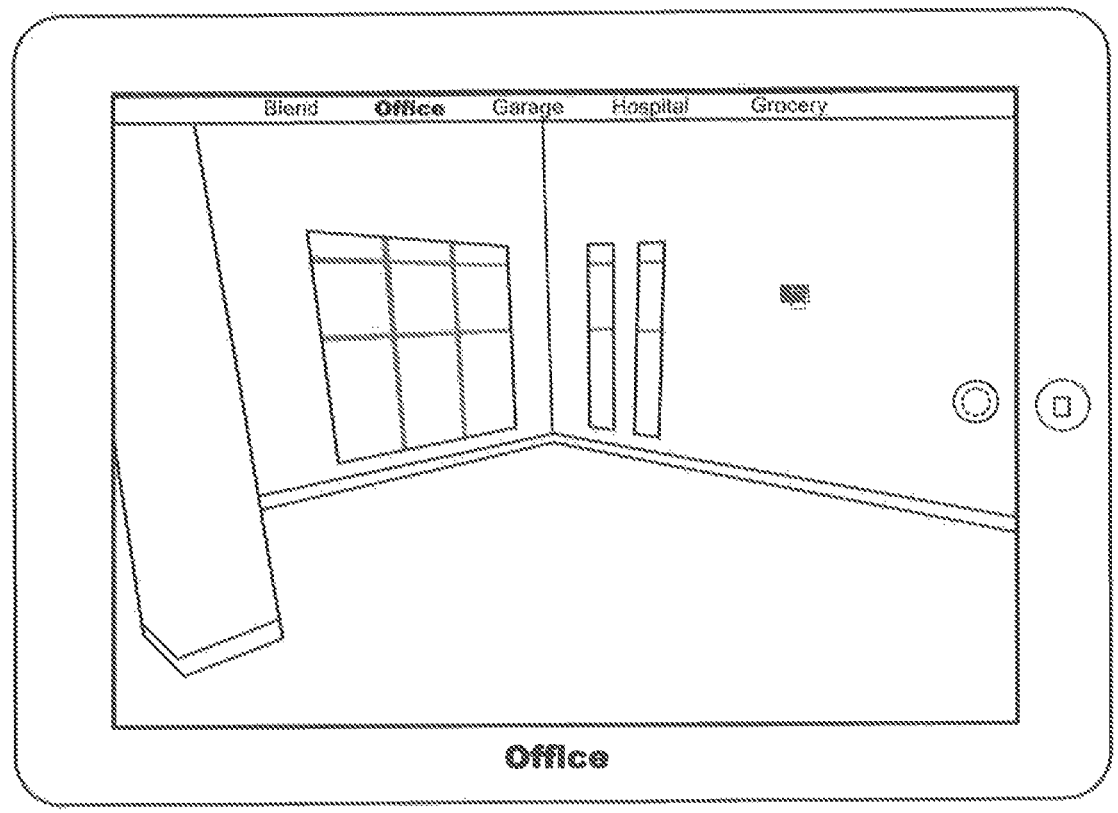
Figure 8:
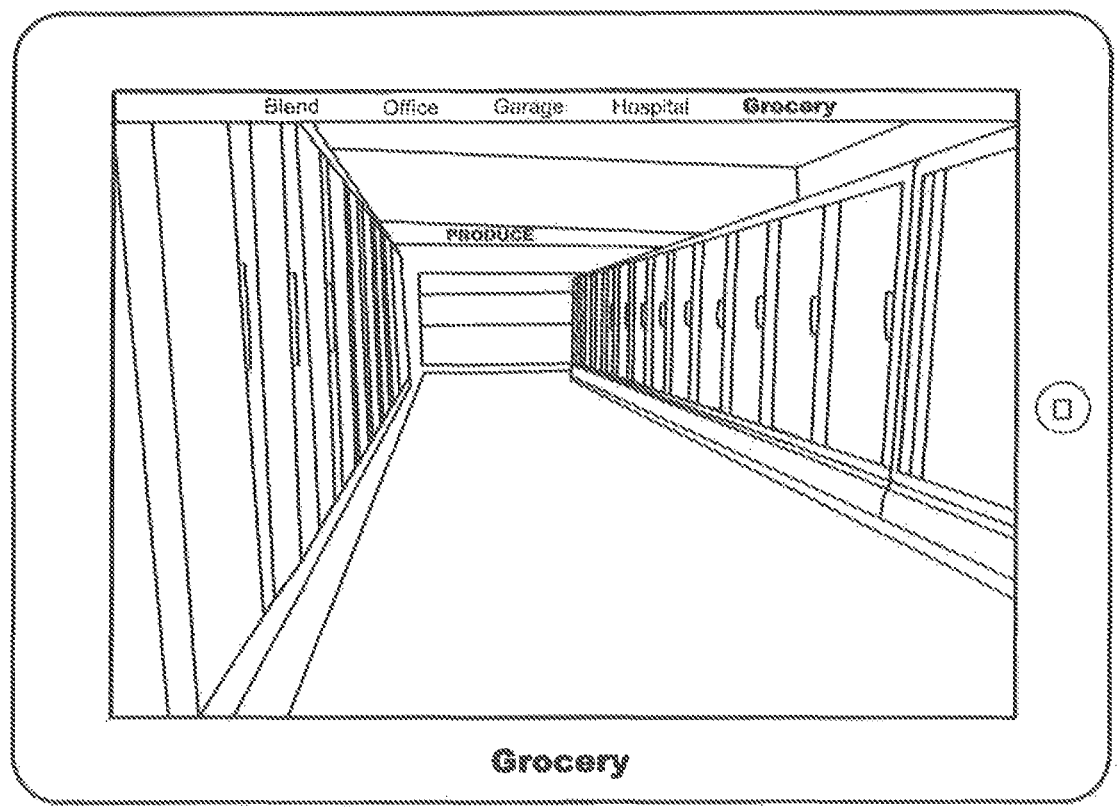
Figure 9:
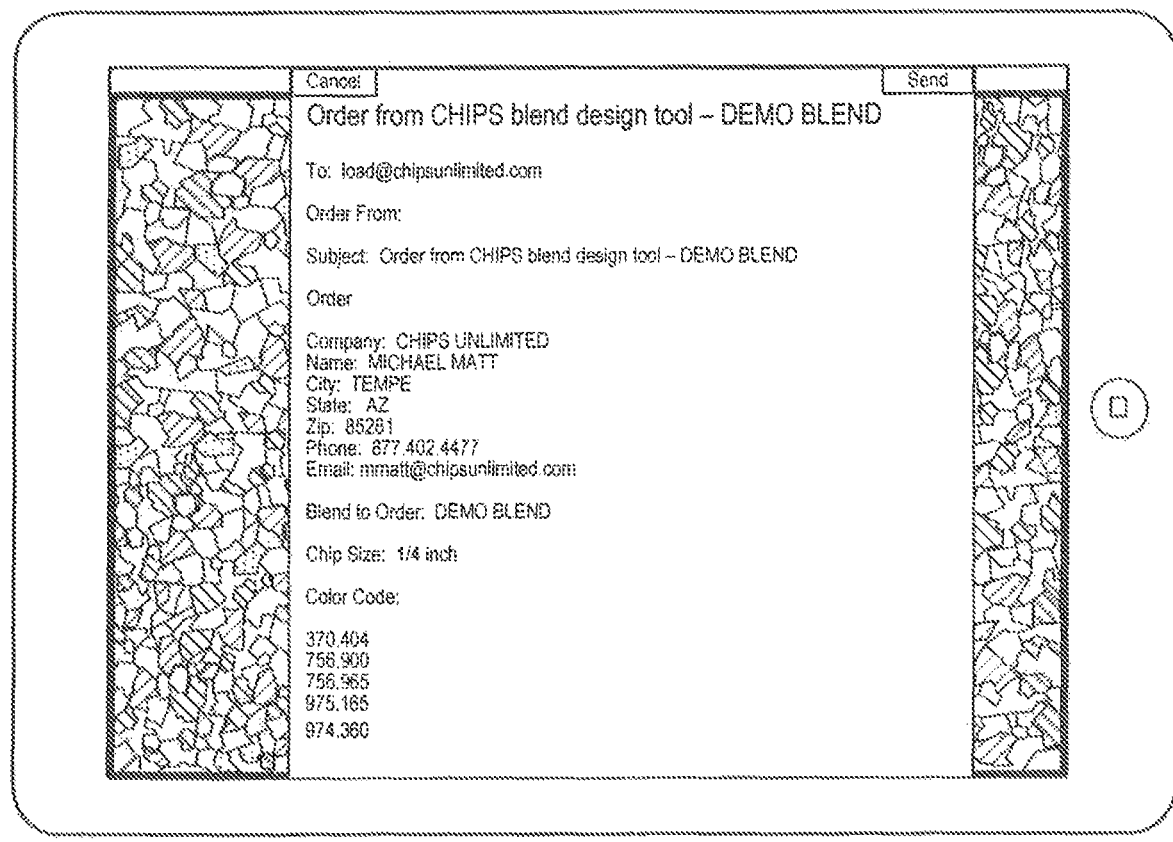
Figure 10:
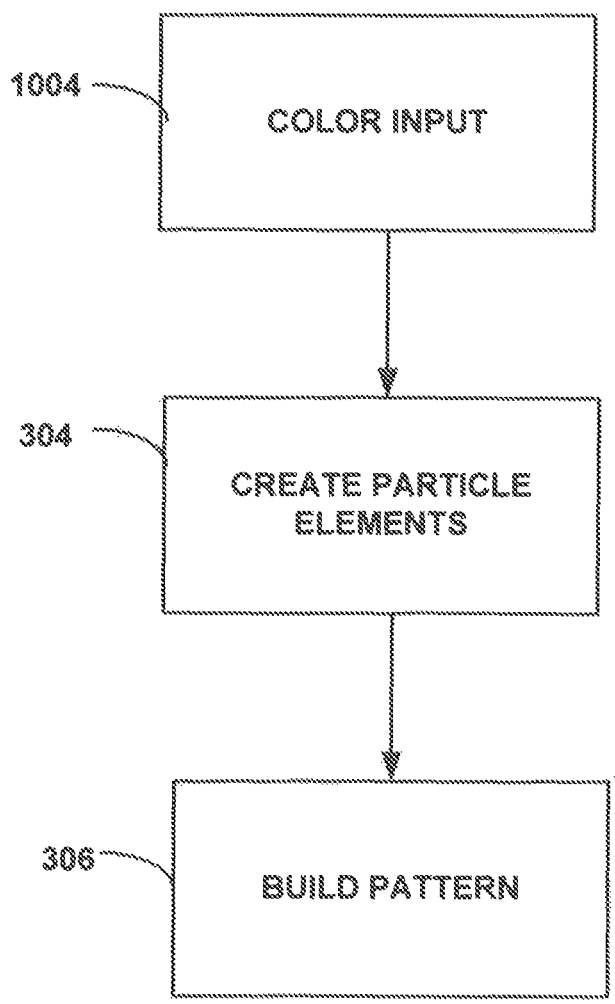
Figure 11:
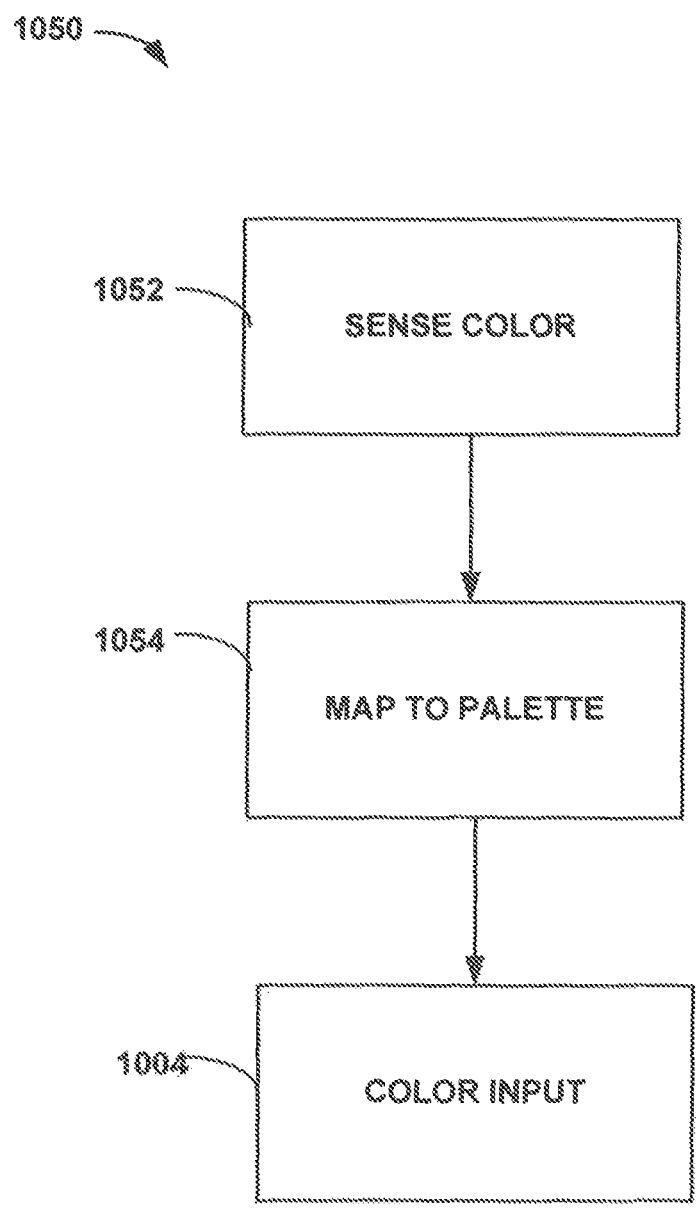

FIG. 5 illustrated an exemplary particle pattern in a larger viewing format;

FIG. 6 illustrates an exemplary user interface in accordance with various embodiments;

FIG. 7 illustrates an exemplary particle pattern displayed in a virtual room in accordance with various embodiments;

FIG. 8 illustrates an exemplary particle pattern displayed in a virtual grocery retail space in accordance with various embodiments;

FIG. 9 illustrates an exemplary email containing a sample particle pattern in accordance with various embodiments;

FIG. 10 illustrates an exemplary method in accordance with various embodiments; and FIG. 11 illustrates an exemplary method in accordance with various embodiments.

DETAILED DESCRIPTION

The detailed description of exemplary embodiments herein makes reference to the accompanying drawings and pictures, which show the exemplary embodiment by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

As described above, seamless covering materials often comprise a hardening material and a plurality of particles. Most commonly, the hardening material, such as polyester, urethane, or epoxy compounds, is applied in viscous form to a substrate. Then, a plurality of particles is broadcast or distributed on top of the hardening material, and the coating is allowed to cure.

Figure 1:
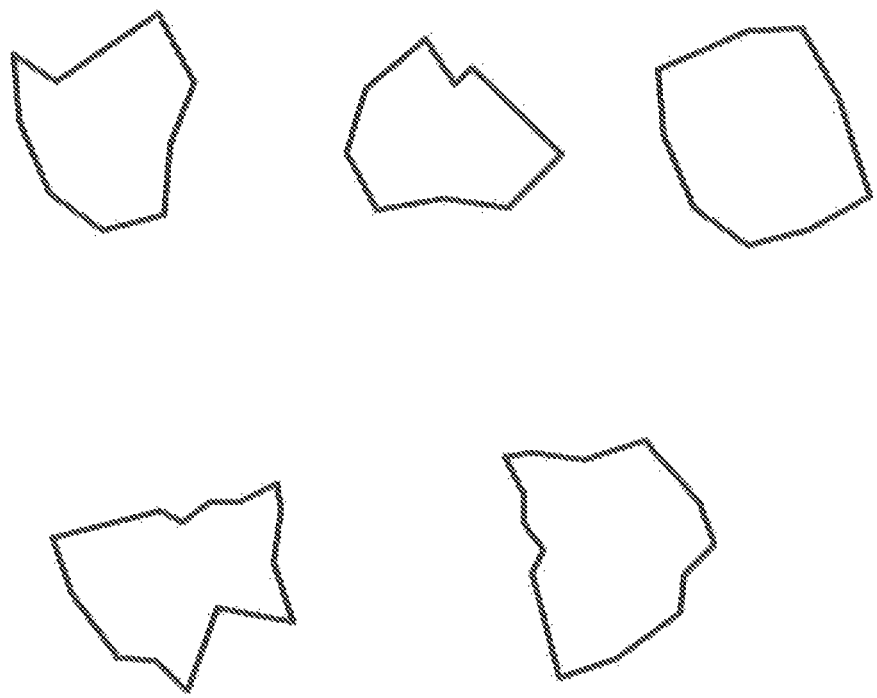
FIG. 1 illustrates exemplary particles in accordance with various embodiments.

With reference to FIG. 1, exemplary particles are illustrated in accordance with various embodiments. The particles may also be referred to as "chips", "flakes" or "fleck." Particles may comprise varying geometries. While particles may comprise regular geometric shapes such as circles, rectangles, squares, and trapezoids, in various embodiments, particles are of an irregular geometry.

Particles are typically thin, having a depth of from about 1 mil to 10 mils and more commonly between 4.5 mils to 5.5 mils. While particle length and width may vary, among particles with irregular geometries, in various embodiments, particles may be of about 2 inches or less in either length or width. For example, particles may range from about 0.015625 inches in length or width to about 1 inch in length or width.

Particles may be of any color or colors and may comprise a graphic pattern, such as a two-tone or striped configuration. In various embodiments, particles may exhibit optical effects that include, but are not limited to, translucent, metallic, reflective, highlight, shadowing, fluorescent, and/or phosphorescent effects.

Figure 2:
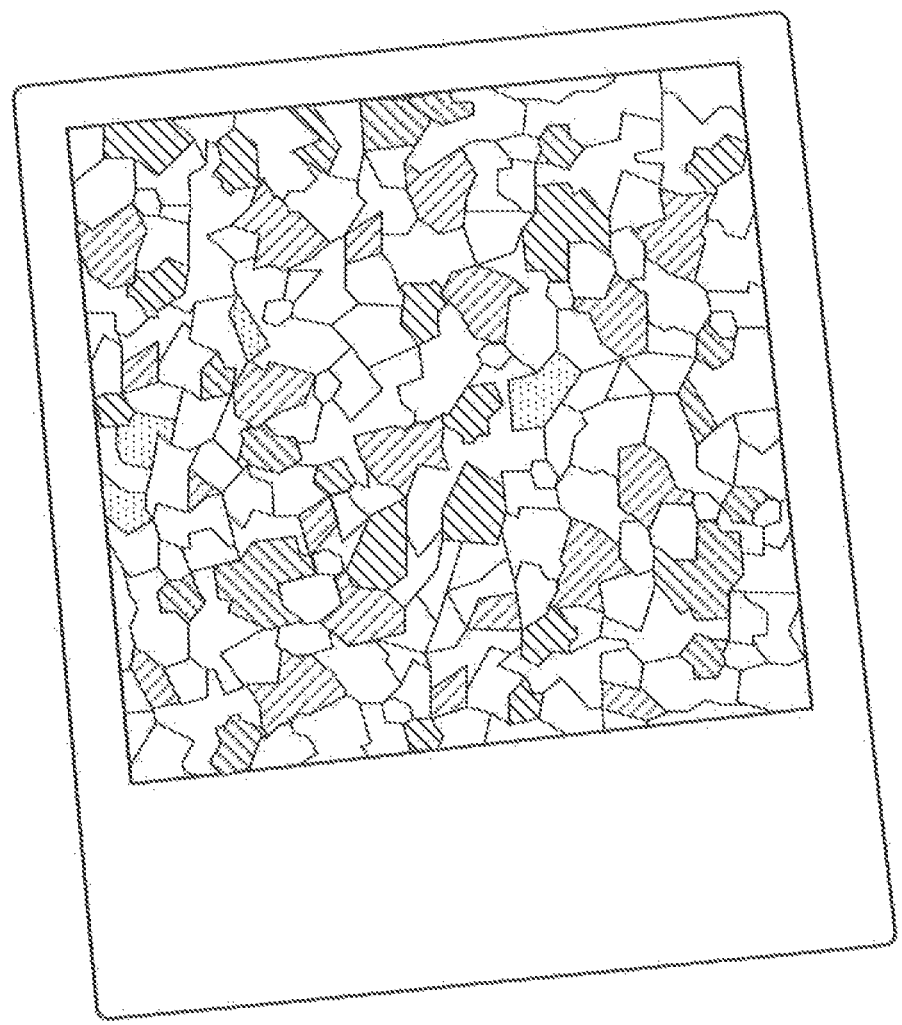
FIG. 2 illustrates an exemplary pattern in accordance with various embodiments.

A plurality of particles may comprise any combination of particles such that each particle may have a different size, color, and/or geometry. Particle parameters may describe one or more properties of a plurality of particles, such as particle size, color, geometry, and the proportion of the number of particles for a given particle size, color, and/or geometry in relation to the total number of particles. A collection of particles may form a particle pattern. A particle pattern includes the particular configuration of a plurality of particles. An exemplary particle pattern is illustrated in FIG. 2.

Because the possible particle parameters are infinite, and because particle distribution on a substrate (e.g., a wall or a floor) is performed randomly upon installation, it may be difficult for one to approximate how a given plurality of particles will appear when applied to a substrate. Stated another way, a pattern of particles is difficult to approximate without performing an installation on a substrate.

In accordance with various embodiments, a method is disclosed that provides pattern simulation in accordance with given particle parameters. In such a manner, accurate pattern simulation is available in real time. Such a method is particularly advantageous when performed on a portable computing device such as a smartphone, tablet computer, or laptop computer. For example, a salesperson could easily input pattern parameters into a table computer at a potential customer's location to simulate how a finished floor or wall covering would appear. The customer may then adjust the particle parameters to achieve a desirable pattern. Once the particle parameters are known, the particle parameters may then be used to generate a purchase order or otherwise transmitted to an external system to facilitate ordering, to check availability, and/or to schedule installation.

In many circumstances, a customer may desire to install a seamless covering in a room (e.g., a garage, warehouse, retail store, workshop, studio, home, etc.) or other place that is already in existence. The room may include various color schemes embodied in, for example, walls, flooring, furniture, equipment, or other colors that appear in the room. Color schemes may be embodied in wall paint color, curtain color selection, furniture upholstery selection, and the like. In other circumstances, a customer may have access to one or more items that will be installed into a room, such as a new paint color. In that regard, in accordance with various embodiments, a color sensor is provided to sense the color of a tangible object. The sensed color, or a color selected based upon the sensed color, may be used as a particle parameter. Stated another way, the color sensor may import one or more "real world" colors, or colors selected from a predetermined color palette based upon one or more "real world" colors, into a particle simulation. This allows for more accurate and precise color selection than has been available in the past.

Figure 3:
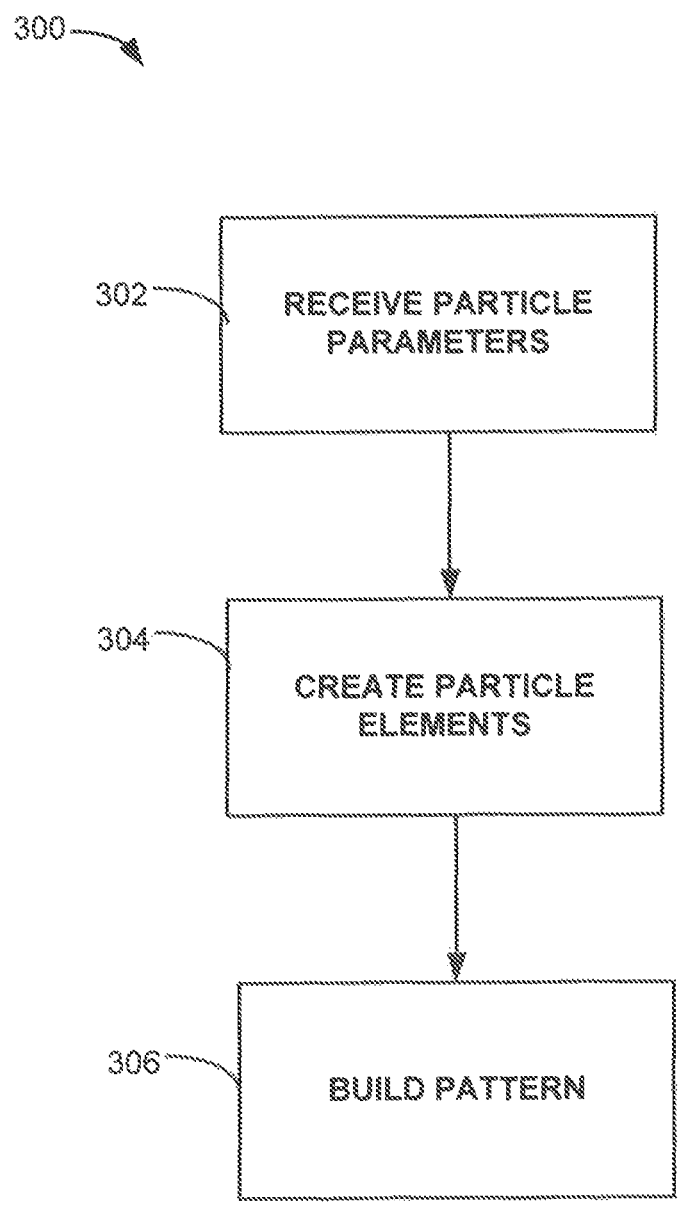
FIG. 3 illustrates an exemplary method in accordance with various embodiments.
Figure 4B:
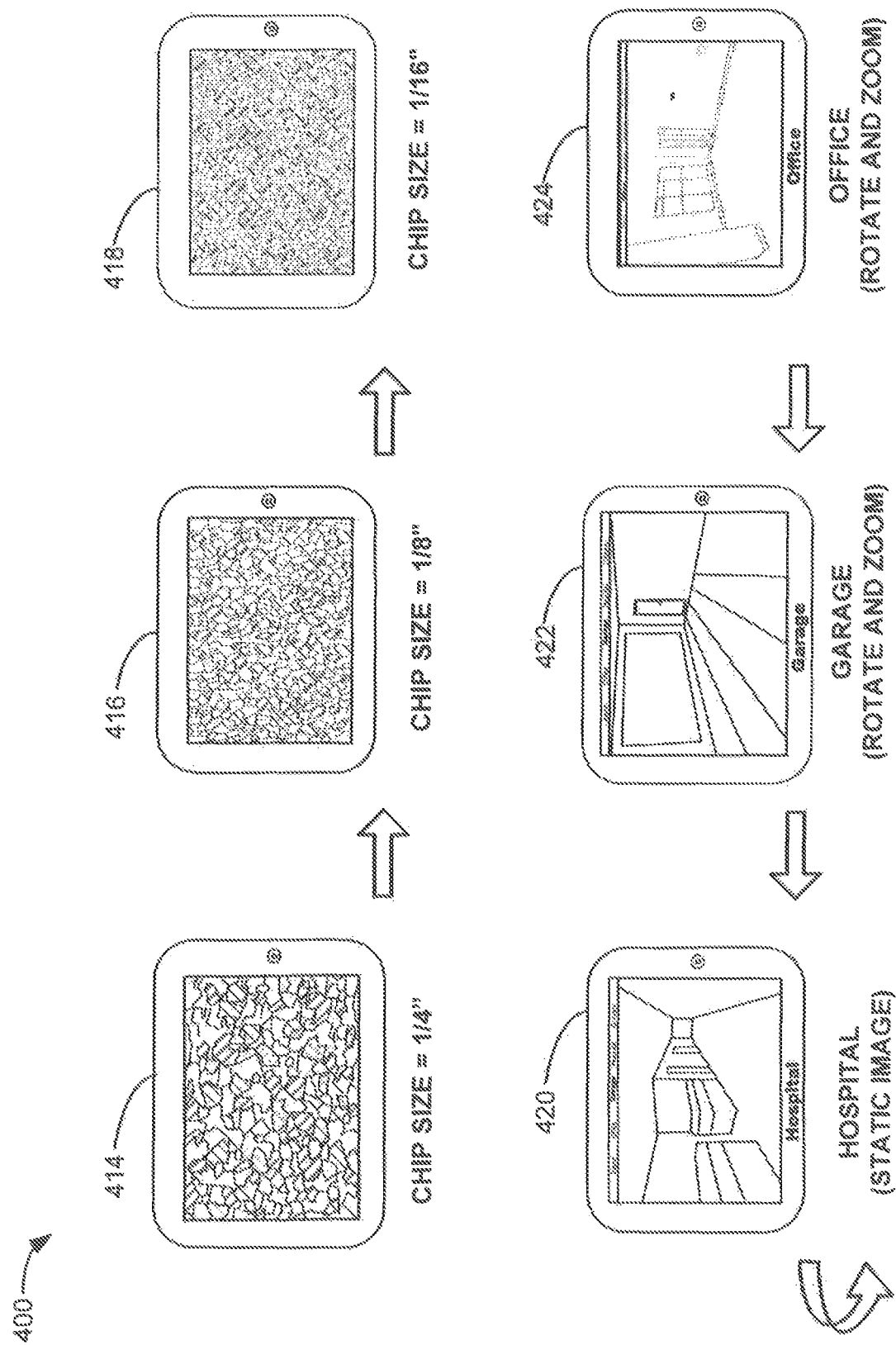
Figure 4C:
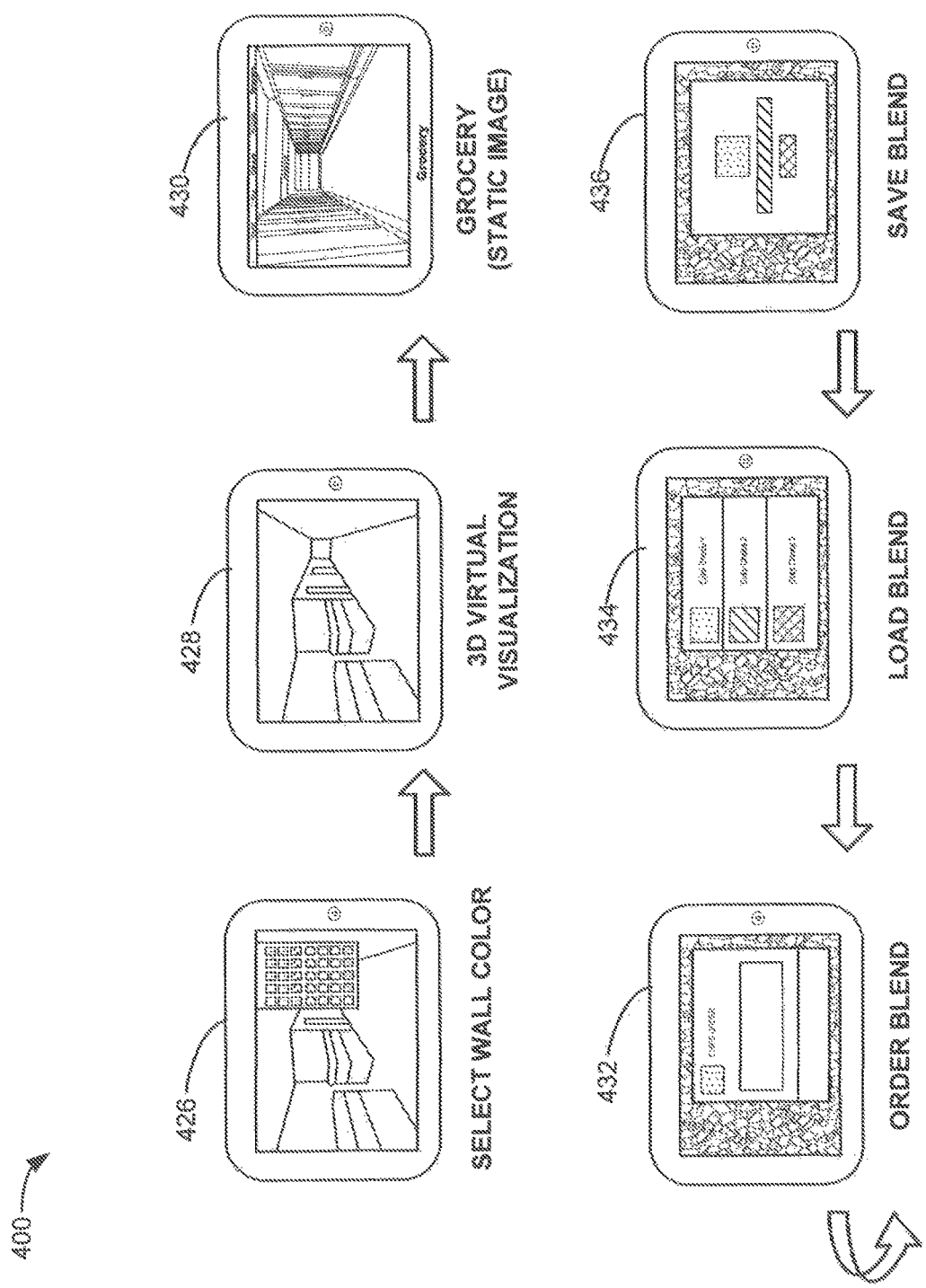
Figure 4D:
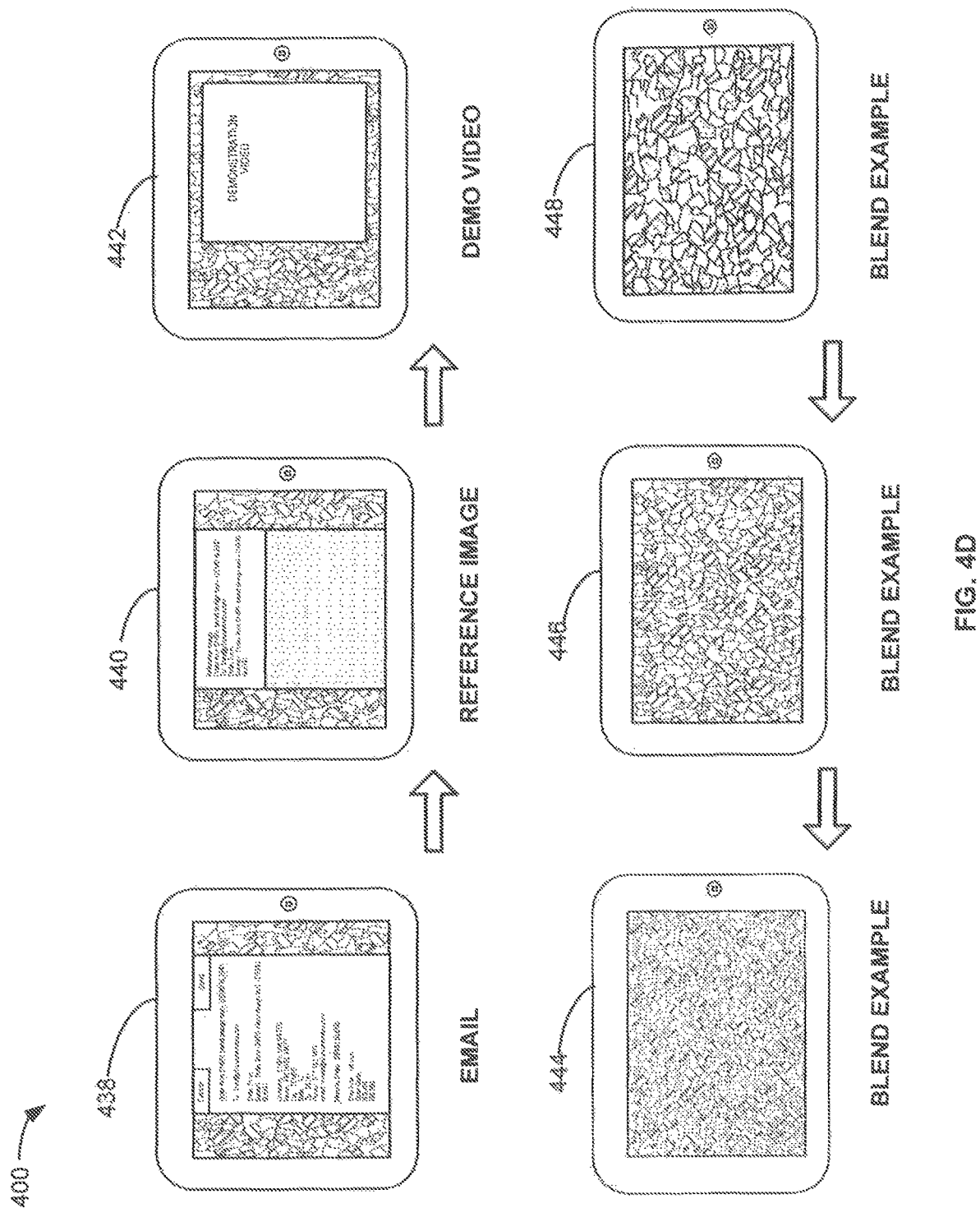

With reference to FIG. 3, exemplary method 300 is illustrated. Step 302 comprises receiving particle parameters. Step 302 may include receiving one more particle parameters that describe a plurality of particles. For example, particle parameters may comprise particle proportion data, particle size, and particle color, such as the following data: 10% red 0.25 inch, 20% green 1 inch, and 70% white 0.125 inches. In such a scenario, for every 100 particles, 10 will be red and have at least one dimension measuring approximately 0.25 inches, 20 will be green and have at least one dimension measuring approximately 1 inch, and 70 will be white and have at least one dimension measuring approximately 0.125 inches.

Particle parameters may also describe how many total particles there will be in a given simulation. For example, to simulate a floor covering, the particle parameters may specify that there will be 10,000 total particles. In various embodiments, the total particle number is not provided in the particle parameters. In such case, a default value for number of particles may used, which may be scalable depending on the size of the simulation.

Step 302 may receive particle parameters from a user interface. The user interface may comprise graphical or numeric input options for a user to select the particle parameters. Graphs, buttons, and slidable indicators may be used in this regard. The user interface may allow a user to choose any combination of particle size, proportional distribution, and/or color. In various embodiments, step 302 comprises receiving an input text stream, such as an email, xml formatted data, or html formatted data, and parsing the input stream to obtain particle parameters. Step 302 may further comprise creation of particle parameters at random.

Step 304 comprises creating particle elements. A particle element is a representation of a particle that may be displayed graphically, such as on an electronic display or on paper. A particle element may have attributes that describe a particle, such as size, color, and/or geometry. A particle element may comprise a data structure that includes one or more data points related to a particle and/or a graphical representation of the same. For example, a data structure may be a run time object or a row in one or more databases.

In various embodiments, step 304 comprises creating particle elements for all or substantially all particles in the plurality of particles. In embodiments where all or substantially all particles in the plurality of particles have particle elements, there is a more accurate approximation of tangible particles.

Step 304 comprises building the particle pattern. The particle pattern may be built by arranging each particle element into a pattern. Such arrangement may occur randomly in that each particle element is assigned a space on a simulated substrate at random. The random approach accurately simulates the actual distribution of particles on a substrate. Particle elements may align so that there is no overlap in the pattern, though in various embodiments particle elements may overlap so that, when viewed, one or more particle elements may obscure another particle element.

Thus, step 304 simulates the actions of mixing particles and distributing them upon a substrate. As seamless coverings are typically installed in such a random manner, the pattern of step 304 approximates the randomness of an actual seamless covering. The pattern of step 304 may be rebuilt periodically to provide alternate randomization.

The particle pattern may be situated in a graphical representation of an environment, such as a garage, warehouse, retail location, or other space. Other structures may be on or next to the particle pattern, such as windows and doors.

In various embodiments, the particle pattern and/or the particle parameters may be incorporated into a purchase order. For example, all or a portion of the particle parameters may be inserted into an email, xml document, or other structured or unstructured data format to form a purchase order. The purchase order may then be transmitted (e.g., emailed) to a third party. For example, a salesperson and a potential customer may change the particle parameters to meet the customer's specifications. The particle parameters may then be transmitted to a warehouse to check availability of the desired particles and/or the availability of an installation timeframe. In addition, the particle parameters may be emailed to another for further simulation.

With reference to FIGS. 4A-4D, an exemplary application flow is illustrated. In various embodiments, an iOS application may execute on an IPAD or IPAD MINI tablet computer, as shown in step 402 and labeled Launch App. A logo or other mark may appear, as shown in step 404 and labeled Chips Animation. A blend design palette may be displayed, as shown in step 406 and labeled Blend Design Pallet. Particle parameters may then be set using a user interface, as shown in step 408 and labeled Select Chip Size. In step 408, various sizes of particles are selected, along with particle colors and the number of different types of particles. In that regard, each particle size and color pairing may be considered a particle type. An exemplary user interface is shown in step 408 that allows for selection of particle size using a slide rule style selection widget. In step 410, particle color may be selected from a color palette. The color palette, either in its entirety or a portion thereof, may be displayed in a user interface to facilitate color selection. The color palette may comprise any suitable color palette, for example, an arbitrary color palette, a paint brand color palette (e.g., SHERWIN WILLIAMS brand paint palette), a PANTONE color palette, an RGB color space, an sRGB color space, an ADOBE RGB color space, and any other color palette now known of hereinafter developed. Step 412 shows the user interface of step 408, after a color has been selected. The user interface shown in step 412 may be referred to as the Composition Tool.

Particle sizes may be adjusted and simulated. For example, step 414 shows chip sizes of ¼". Step 416 shows chip sizes of ⅛". Step 418 shows chip sizes of ⅟₁₆".

The blend (i.e., collection of particle elements) may be applied to virtual environments, such as a virtual grocery space, virtual hospital as shown in step 420, virtual garage as shown in step 422 and virtual office as shown in step 424. The various features of a room may be input into a user interface, such as that shown in step 426. For example, wall color, the number and size of windows, or other features may be input for rendering. In addition, room features may be imported from a separate data file and, in various embodiments, photographs may be used to identify objects and render virtual representations of those objects.

In various embodiments, three dimensional spaces may be navigated as shown in step 428. However, in various embodiments, a two dimensional static image may also be used to model a given space such as that shown in step 428.

The blend (i.e., collection of particle elements) may be saved in a tangible, non-transitory memory, such as labeled as step 430. Blends that have been previously saved may be loaded as labeled as step 434 and/or ordered as labeled as step 436.

A saved blend may be emailed, as labeled as step 438. The email in step 438 may describe the blend in any suitable format, such as plain text, xml, html, or other suitable format. A sample representation of the blend (i.e., collection of particle elements), shown labeled as step 440, may be included in the email. Further, a video may be created to showcase various saves blends. For example, as shown as labeled step 442 that comprises three blend sample, 444, 446 and 448.

With reference to FIG. 5, a sample blend is shown on a tablet computer. FIG. 6 illustrates an exemplary user interface such as that also shown in step 408. Sliding bars are used to control particle size. Particle color may also be selected. The proportion of each particle type may also be input. If one desires to set a proportion of one or more particle size/color combinations and then "fill" the rest of the blend with another particle type, on may be accomplish this using the user interface. For example, one may fix two particle types at 20% and 30%, and then one or more other particle types will be automatically filled to reach a full 100%.

FIGS. 7 and 8 illustrate, in a larger format, virtual spaces that may be rendered as static images or as navigable, 3D spaces. FIG. 8 illustrates, in a larger format, a portion of an exemplary email that contains a description of a particular particle blend. The blend is described using color codes, particle size, and proportion of each type of particle.

In various embodiments, and with reference to method 1000 of FIG. 10, one or more colors may be input into method 300. In that regard, one or more colors may be received and used in the creation of a particle blend. In step 1004, color input is sent to create particle elements 304. The color input may be represented in any format, and may represent a color of, for example, a color palette. The color input may be included with other particle element parameters, such as particle size and the proportion of one particle type to another.

With reference to FIG. 11, method 1050 is shown. Method 1050 enables a real world color to be imported into a virtual representation of a particle blend. In various embodiments, the real world color may be matched to a predetermined color palette, allowing for a tangible recreation in a particle blend. In this manner, a real world color may be approximated, if needed, to fit the color palette so that particles fabrication may be completed.

In step 1052, a color is sensed. The color may exist in the real world as reflecting or radiating from any object. For example, a painted wall, a piece of polished stone (e.g., granite), a tile, a carpet, fiberglass, or other object may reflect a given color. The reflected color may be sensed by a color sensor. The color sensor, as described above, may capture the sensed color and represent the sensed color as a digital or analog representation.

In various embodiments, a color sensor may be used to sense a color of a "real world" object. The color sensor may comprise any device that may sense a color. The color sensor may sense color using a variety of methods. For example, a color sensor may passively accept light and determine the color of the light. A color sensor may also emit a known wavelength of light, receive a reflection of that light, and determine color in that manner.

Though any color sensor is contemplated herein, a color sensor may receive light and convert the light into a frequency. The output frequency may be output in any suitable manner, for example, a square wave. The output frequency may be representative of the color of the light received by the color sensor. An exemplary color sensor that may be used in various embodiments is the TCS3200 (Texas Advanced Optoelectronic Solutions, Inc., 1001 Klein Road, Suite 300, Plano, Tex. 75074).

The output of the color sensor may comprise any data that corresponds to a particular color. For example, the output of the color sensor may comprise a frequency. The output of the color sensor may also comprise a digital representation of color. The digital representation may encode a frequency or wavelength of the color represented. The output of the color sensor may also comprise a red green blue ("RGB") value.

The color sensor may be embedded in any device or may be a stand-alone device. For example, the color sensor may be included in a smartphone, tablet device (e.g., IPAD or IPAD MINI), phablet computer, laptop computer, desktop computer, or similar devices. In various embodiments, the color sensor is not embedded in a smartphone or tablet device.

In various embodiments, the color sensor is in communication, such as electrical communication or logical communication, with a processor. Logical communication may involve the communication of output data from the color sensor to the processor via various communications protocols over physical or wireless connections. For example, a logical communication may include a BLUETOOTH connection, near field communication ("NFC"), a wireless Ethernet (e.g., 802.11a/b/g/n), a wired Ethernet connection, a Universal Serial Bus ("USB") connection, or any similar connection. One or more devices or components may receive the output of the color sensor and package or otherwise manipulate the output in preparation for transmission via the aforementioned connection types. For example, an analog output of the color sensor may be converted to a digital representation prior to transmission via a BLUETOOTH connection.

The output of the color sensor may be mapped or otherwise correlated to a predetermined color palette. For example, in step 1054, the sensed color is mapped to a color palette. The predetermined color palette may represent a paint company's color palette. In that regard, any selected color in the color palette may be used to create particles. The sensed color may be matched or otherwise fit to a color in the color palette. In various embodiments, the mapping will seek to closely align the sensed color to a color in the color palette. For example, a color sensor may sense a dark blue. In step 1554, the sensed blue may be mapped to Pantone PMS 287 or, as represented in a hexadecimal, 001A57, or the SHERWIN WILLIAMS color Blueblood (hexadecimal 024889). Thus, the sensed color may be based upon the available color palette. For example, if the sensed color may be represented by 001A57 but the SHERWIN WILLIAMS palette does not contain 001A57, another similar blue such as 024889 may be used.

In various embodiments, step 1054 maps the sensed color to a complementary or contrasting color. In that regard, visually appealing (or, if desired, visually unappealing) effects may be obtained by using the sensed color as a basis for selection of another color. For example, if a color sensor senses a color such as Pantone PMS 287, step 1054 may map to Pantone PMS 278. In such a manner, selectable color coordination may be achieved. Step 1054 may output a mapped color in that the output color is the color from the predetermined color palette and not necessary the same color as the sensed color. The mapped color may be used as the color input in step 1004.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, a computer system may include an operating system (e.g., Windows NT, Windows 95/98/2000, Windows XP, Windows Vista, Windows 7, OS2, UNIX, Linux, Solaris, MacOS, iOS, Android, etc.) as well as various conventional support software and drivers typically associated with computers. A user may include any individual, business, entity, government organization, software and/or hardware that interact with a system.

A web client includes any device (e.g., personal computer, tablet computer, or smartphone) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A webclient may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, iOS, Android, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Firewalls may include any hardware and/or software suitably configured to protect various components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other various components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix My SQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, web sites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. § 101, so long as and to the extent In re Nuijten remains binding authority in the U.S. federal courts and is not overruled by a future case or statute. Stated another way, the term "computer-readable medium" should be construed in a manner that is as broad as legally permissible Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    creating, by a computer-based system, particle elements for graphical display, wherein the particle elements comprise attributes corresponding to particle parameters, and wherein the particle parameters describe a property of a plurality of particles for use in a seamless surface covering;
    building, by the computer-based system, a particle pattern by arranging the particle elements to form the particle pattern, wherein each particle element is assigned to a position in the particle pattern to simulate a distribution of physical particles; and
    rendering, by the computer-based system, a second virtual environment by overlaying the particle pattern on a virtual environment, wherein the second virtual environment is configured for graphical display to simulate the distribution of physical particles on a physical substrate.

2. The method of claim 1, further comprising importing, by the computer-based system, the virtual environment comprising at least one of a floor, a wall, or a ceiling.

3. The method of claim 2, wherein the rendering the second virtual environment comprises overlaying the particle pattern on to at least one of the floor, the wall, or the ceiling of the virtual environment.

4. The method of claim 2, further comprising importing, by the computer-based system, a room feature for the virtual environment, wherein the room feature comprises at least one of a wall color, a number of windows, a size of each window, wherein the second virtual environment is rendered to include the room feature.

5. The method of claim 2, wherein the position assigned to each particle element comprises a random position in the particle pattern.

6. The method of claim 5, further comprising:
    rebuilding, by the computer-based system, the particle pattern by arranging the particle elements to form the particle pattern, wherein each particle element is assigned to a second random position in the particle pattern to simulate a second distribution of physical particles; and
    rendering, by the computer-based system, a third virtual environment by overlaying the particle pattern on to at least one of the floor, the wall, or the ceiling of the virtual environment, wherein the third virtual environment is configured for graphical display to simulate the second distribution of physical particles on the physical substrate.

7. The method of claim 1, further comprising receiving, by the computer-based system, the particle parameters from a web client, wherein the web client is configured to display a user interface for selecting the particle parameters.

8. The method of claim 1, further comprising:
    receiving, by the computer-based system, an input text stream, wherein the input text stream comprises an email, XML formatted data, or HTML formatted data, and wherein the input text stream comprises the particle parameters; and
    parsing, by the computer-based system, the input text stream to determine the particle parameters.

9. The method of claim 1, further comprising:
    importing, by the computer-based system, a photograph comprising a physical object; and
    rendering, by the computer-based system, a virtual representation of the physical object, wherein the second virtual environment is rendered to include the virtual representation of the physical object.

10. A system for simulating particle patterns for use in a seamless surface covering, the system comprising:
    a color sensor in communication with a processor; and
    a non-transitory memory in communication with the processor, the non-transitory memory having instructions stored thereon that, in response to execution by the processor, cause the processor to perform operations comprising:
    receiving, by the processor, an input color from the color sensor;
    creating, by the processor, particle elements for graphical display, wherein the particle elements comprise attributes corresponding to particle parameters, and wherein the particle parameters include the input color and describe a property of a plurality of particles for use in the seamless surface covering;
    building, by the processor, a particle pattern by arranging the particle elements to form the particle pattern, wherein each particle element is assigned to a position in the particle pattern to simulate a distribution of physical particles; and
    rendering, by the processor, a second virtual environment by overlaying the particle pattern on a virtual environment, wherein the second virtual environment is configured for graphical display to simulate the distribution of physical particles on a physical substrate.

11. The system of claim 10, further comprising importing, by the processor, the virtual environment comprising at least one of a floor, a wall, or a ceiling.

12. The system of claim 11, wherein the rendering the second virtual environment comprises overlaying the particle pattern on to at least one of the floor, the wall, or the ceiling of the virtual environment.

13. The system of claim 10, wherein the color sensor emits electromagnetic radiation of a known wavelength at an object, wherein the color sensor receives a reflection of the electromagnetic radiation of the known wavelength, wherein the reflection is represented by a red green blue ("RGB") value, wherein the RGB value is mapped to a first color of a color palette, and wherein the input color comprises the first color of the color palette, a second color from the color palette that complements the first color, or a third color from the color palette that contrasts the first color.

14. The system of claim 10, wherein the color sensor is configured to passively accept light and convert the light into an output frequency, wherein the output frequency is representative of a color of the light received by the color sensor, wherein the output frequency is mapped to a first color of a color palette, and wherein the input color comprises the first color of the color palette, a second color from the color palette that complements the first color, or a third color from the color palette that contrasts the first color.

15. A method comprising:
creating, by a processor, particle elements for graphical display, wherein the particle elements comprise attributes corresponding to particle parameters, and wherein the particle parameters comprise at least one of a total number of particles, a particle color, a particle size, a particle shape, and a proportion of each particle color to the total number of particles;
building, by the processor, a particle pattern by arranging the particle elements to form the particle pattern, wherein each particle element is assigned to a position in the particle pattern to simulate a distribution of physical particles; and
rendering, by the processor, a second virtual environment by overlaying the particle pattern on a virtual environment, wherein the second virtual environment is configured for graphical display to simulate the distribution of physical particles on a physical substrate.

16. The method of claim 15, further comprising importing, by the processor, the virtual environment comprising at least one of a floor, a wall, or a ceiling.

17. The method of claim 16, wherein the rendering the second virtual environment comprises overlaying the particle pattern on to at least one of the floor, the wall, or the ceiling of the virtual environment.

18. The method of claim 15, wherein the particle shape comprises at least one of a circle, a rectangle, a square, a trapezoid, and an irregular geometry, wherein the particle size defines a dimension of the particle element, and wherein the dimension comprises a width, a length, and a depth.

19. The method of claim 15, wherein the particle color comprises at least one of an optical effect or a graphical representation, wherein the optical effect comprises at least one of a translucent effect, a metallic effect, a reflective effect, a highlight effect, a shadowing effect, a fluorescent effect, or a phosphorescent effect, and wherein the graphical representation comprises at least one of a color chip, a color flake, a color quartz, mica, glass, stones, or rock.

20. The method of claim 15, wherein the particle element comprises a data structure including a data point related to a physical particle or a graphical representation of the physical particle, and wherein the data structure comprises a run time object or a row in a database.

* * * * *